(12) United States Patent
Heigl

(10) Patent No.: US 8,077,545 B2
(45) Date of Patent: Dec. 13, 2011

(54) METHOD FOR DETECTING GAS INFLUX IN WELLBORES AND ITS APPLICATION TO IDENTIFYING GAS BEARING FORMATIONS

(75) Inventor: Werner M. Heigl, Katy, TX (US)

(73) Assignee: Apache Corporation, Houston, TX (US)

( * ) Notice: Subject to any disclaimer, the term of this patent is extended or adjusted under 35 U.S.C. 154(b) by 667 days.

(21) Appl. No.: 12/199,538

(22) Filed: Aug. 27, 2008

(65) Prior Publication Data

US 2009/0059720 A1    Mar. 5, 2009

Related U.S. Application Data

(60) Provisional application No. 60/968,789, filed on Aug. 29, 2007.

(51) Int. Cl.
*G01V 1/00* (2006.01)

(52) U.S. Cl. .......................................................... 367/35
(58) Field of Classification Search ..................... 367/25, 367/27, 32, 35
See application file for complete search history.

(56) References Cited

U.S. PATENT DOCUMENTS 4,628,725 A * 12/1986 Gouilloud et al. ............ 73/19.03
7,660,195 B2 * 2/2010 Mandal et al. ................... 367/29

* cited by examiner

*Primary Examiner* — Jack Keith
*Assistant Examiner* — Krystine Breier
(74) *Attorney, Agent, or Firm* — Richard A. Fagin

(57) ABSTRACT

A method for identifying gas in a wellbore includes imparting acoustic energy into the wellbore at a first selected position and detecting the acoustic energy at a second position in the wellbore spaced apart from the first position. Acoustic velocity of fluid in the wellbore from the detected acoustic energy. Presence of gas in the fluid is determined from the velocity.

5 Claims, 1 Drawing Sheet

METHOD FOR DETECTING GAS INFLUX IN WELLBORES AND ITS APPLICATION TO IDENTIFYING GAS BEARING FORMATIONS

CROSS-REFERENCE TO RELATED APPLICATIONS

Priority is claimed from U.S. Provisional Application No. 60/968,789 filed on Aug. 29, 2007.

STATEMENT REGARDING FEDERALLY SPONSORED RESEARCH OR DEVELOPMENT

Not applicable.

BACKGROUND OF THE INVENTION

1. Field of the Invention

The invention relates generally to the field of drilling wellbores through subsurface formations to produce hydrocarbons. More specifically, the invention relates to methods for identifying gas productive subsurface formations in such wellbores.

2. Background Art

Wellbores are drilled through subsurface formations to extract hydrocarbons, among other purposes for such wellbores. Drilling a wellbore using processes known in the art includes suspending a "string" of drill pipe or similar tubular apparatus from a structure called a "rig" at the Earth's surface. The string typically includes a drill bit at its lower end. The rig includes equipment to rotate the string while the bit is urged into contact with the subsurface formations. A pump lifts drilling fluid ("mud") from a pit or tank and moves it through a central passage in the pipe string. The mud is discharged through courses or nozzles in the drill bit to cool the bit, to lubricate the bit, and to lift drill cuttings to the Earth's surface.

Typically the drilling mud includes "weighting material" in suspension such as barium sulfate ("barite") or similar high density solid particulate material, such that the drilling mud has a density selected to exert a predetermined hydrostatic pressure on the drilled subsurface formations. Such pressure may be the same as or slightly greater than the expected pressure of fluids in the various subsurface formations. Such hydrostatic pressure serves to maintain mechanical stability of the wellbore as it is drilled, and to prevent uncontrolled influx of fluids into the wellbore during drilling.

More recently, it has become known in the art to drill wellbores using drilling mud density slightly below the expected pressure of subsurface formations. Such drilling technique is referred to as "underbalanced drilling" and has as one purpose the reduction or avoidance of damage to the permeability of certain formations by the action of the drilling mud on such formations. It is desirable when drilling such formations to be able to identify those that may be productive of certain hydrocarbons, such as natural gas.

One method for determining the presence of gas entering a wellbore is described in U.S. Pat. No. 5,222,048 issued to Grosso et al. The method described in the '048 patent includes deploying a measurement while drilling ("MWD") instrument in a wellbore during the drilling thereof. The MWD instrument includes a device for modulating pressure in the drill string so that signals can be communicated to the Earth's surface from the MWD instrument. Such pressure modulation also causes detectable pressure variations in an annular space between the wall of the wellbore and the drill string. Fluid influx into the wellbore is detected by examining and monitoring the computed annulus acoustic signal transfer function. When a downhole energy source, such as MWD pressure pulses, travel to the surface through the drillstring channel and through the annulus channel, the source becomes distorted. The shape (e.g. waveform) of the original signal is known, either because a pre-determined message is sent, or because the transmitted message is reconstructed at the surface. This known transmitted signal is processed with the received signal (which includes the channel distortion) in order to determine the transfer function H(s), of the annulus channel. When a fluid possessing different physical properties as the drilling fluid, such as gas, intrudes into the annular space, the annulus transfer function H(s) will most likely be changed and this change can be used to determined the intrusion. Because the presence of gas in the annulus fluid will greatly change the transfer function H(s) of the annulus signal, this change can be particularly useful as an indicator of gas influx.

U.S. Pat. No. 4,692,908 issued to Ekstrom et al. describes An acoustic method and apparatus for investigating an earth formation penetrated by a borehole are described. Acoustic transducers are mounted on a tool to accurately determine the distance between a segment of the tool and the wall of the borehole. The acoustic transducers are positioned in such manner that the stand-off distance between individual resistivity measuring electrodes in an array, which is also mounted on the tool segment, and the borehole wall can be measured. The stand-off measurement is recorded and may be used to correct the electrode resistivity measurements. In one embodiment a calibration of acoustic transducers as a function of depth is obtained by employing acoustic calibrating transducers to compensate for borehole environment effects on the performance of the acoustic transducers as well as determine the acoustic velocity of the borehole fluid, such as mud. See also U.S. Pat. No. 6,957,700 issued to Mandal.

There continues to be a need for improved methods to determine the presence of gas in a wellbore during and after drilling.

SUMMARY OF THE INVENTION

A method for identifying gas in a wellbore according to one aspect of the invention includes imparting acoustic energy into the wellbore at a first selected position and detecting the acoustic energy at a second position in the wellbore spaced apart from the first position. Acoustic velocity of fluid in the wellbore is determined from the detected acoustic energy. Presence of gas in the fluid is determined from the velocity.

Other aspects and advantages of the invention will be apparent from the following description and the appended claims.

DETAILED DESCRIPTION

Figure 1:
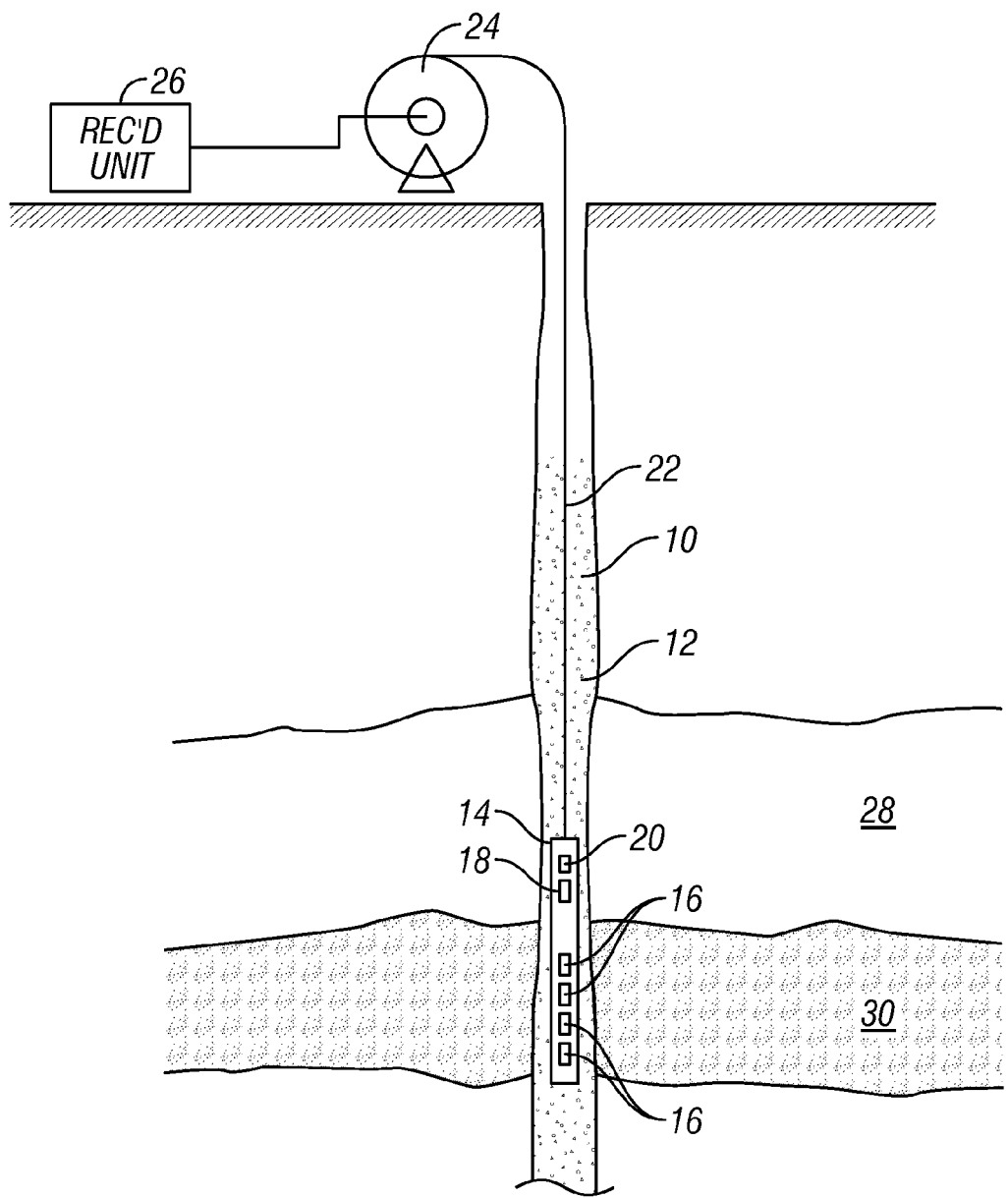
FIG. 1 shows an acoustic well logging instrument in a wellbore as it may be used in accordance with the invention.

In a method according to the invention, a wellbore drilled through the Earth's subsurface may be surveyed or "logged" using acoustic measuring instruments. One such instrument is known by the trademark WAVESONIC, which is a trademark of Halliburton Energy Services Inc., Houston, Tex. During the drilling or after a portion of the wellbore is drilled, a well logging instrument such as the aforementioned instrument may be operated in the wellbore. Measurements related to detection of acoustic energy may be subjected to one more processing procedures as will be further explained, and an indication of entry of gas into the wellbore may be made as a result thereof. In particular, the signals are processed to identify those components that represent acoustic energy traveling entirely within the wellbore and thus having velocity related to the acoustic velocity of the drilling mud. Such components may be used to estimate the acoustic velocity of the drilling mud. When the acoustic velocity of the drilling mud indicates a substantial decrease, such decrease is associated with entry of gas into the wellbore. Such entry may be further associated with gas-productive subsurface formations.

An example of a well logging instrument in a wellbore as it may be used in accordance with the invention is shown in FIG. 1. A wellbore 10 drilled through subsurface Earth formations, e.g., 28 and 30 includes fluid called "drilling mud" 12 therein. A well logging instrument 14 is deployed in the wellbore 10 by an armored electrical cable 22 called a "wireline." The cable 22 may be extended into the wellbore 10 and withdrawn therefrom using a winch 24 or similar spooling device known in the art. Electrical conductors (not shown) in the cable 22 are electrically coupled to suitable circuitry (not shown separately) in a recording unit 26 at the Earth's surface. The circuitry in the recording unit 26 can detect and process signals from the well logging instrument 14 to obtain information about the drilling mud 12 as will be further explained below.

The example well logging instrument 14 may include an acoustic transmitter 18 such as a monopole or dipole transmitter, and a plurality of acoustic receivers 16 at spaced apart positions along the instrument. Control and signal processing circuits 20 in the instrument 14 cause the transmitter 18 to actuate at selected times, causing acoustic energy to be imparted into the mud 12. The acoustic energy travels through the mud 12 and interacts with the formations 28, 30 at the wall of the wellbore as will be explained below. Various components of the acoustic energy are eventually detected by the receivers 16. The receivers can generate an electrical or optical signal related to a characteristic, such as amplitude, of the acoustic energy. Such signals are detected and processed in the instrument circuits 20. The entire detected signal from each receiver 16 may be communicated to the recording unit 26 over the cable 22, and/or processed signals may be stored in recording devices (not shown separately) in the instrument circuits 20.

Having explained in general terms how signals may be acquired according to the invention, the basis for processing the signals and the manner thereof will now be explained.

The density of and the bulk modulus of a mixture of fluids depend on the densities and bulk moduli of its constituents. The mixture properties in turn determine its acoustic velocity, that is, the speed at which acoustic waves propagate in the mixture. It is well known that both density and bulk modulus decrease if one of the constituents is gas, which is relatively much more compressible than liquids. The effect is more pronounced on the bulk modulus than on the gas.

Because density is a measure of mass per unit volume, the density of a mixture $\rho_m$ is an arithmetic average of the densities of the separate constituent materials in the mixture:

$$\rho_m = \phi_1 \rho_1 + \phi_2 \rho_2$$

where the $\phi$ terms represent the corresponding volume fraction of the individual constituents of the mixture. Assuming that there is no mass interchange between the two above constituents and that both are at the same pressure, the bulk modulus of the mixture is given by Wood's equation:

$$K_m = \frac{1}{\frac{\phi_1}{K_1} + \frac{\phi_2}{K_2}}$$

It is apparent from the two equations above that for a small amount of highly compressible substance such as gas intermixed with liquid, the density of the mixture is relatively unaffected. The density is dominated by the density of the liquid constituent. The bulk modulus of the mixture, however, is strongly affected by even small amounts of gas in the mixture. For example, a mixture of pure water (K=2.2 GPa) and a volume fraction of only 5% methane (K=0.25 GPa) will have a bulk modulus of about 1.6 GPa. Such bulk modulus is about 27% below the bulk modulus of pure water.

If the bulk modulus of a liquid-gas mixture is highly sensitive to small amounts of gas, so is the acoustic velocity of the mixture. A measured fluid velocity in the drilling mud that is lower than the expected value of non-gas containing mud may be indicative of gas in the drilling mud.

Acoustic wave propagation from the transmitter 18 on the well logging tool 14 in the wellbore 10 is a complex phenomenon due to the large number of different waves generated. The well logging transmitter 18 may be conceptualized as a point source of energy disposed along the wellbore axis, and when actuated creates a pressure pulse that expands spherically from the point. When the spherical wave impacts the wellbore wall, the acoustic wave will be partially reflected and partially transmitted. Because the acoustic velocity in the formation is usually higher than the drilling mud velocity, the transmitted wave is refracted and this refracted wave travels in the borehole fluid at formation velocity. The refracted wave is typically used to estimate formation velocity.

Because the acoustic wave from the source may be thought of as spherical, part of its wavefront travels along the wellbore axis at the velocity of the drilling mud. For purposes of determining presence of gas in the drilling mud, such wave is the one of interest. But in order to detect such wave it is necessary to account for the effects of the refracted and reflected waves.

The reflected wave essentially reflects back and forth across between the wellbore walls and at every interaction between the drilling mud and formation creates another transmitted, refracted, and reflected wave. The amplitude of the reflected wave is relatively high due to the large reflection coefficient at the borehole wall. Any wavefront created by such a reflection itself has a portion that travels along the wellbore axis.

Contrary to the direct wave, this portion propagates at a velocity that is a complicated function of the drilling mud velocity, the subsurface formation acoustic properties, the wellbore diameter, and the frequency content of the acoustic source. Normal modes of acoustic energy propagation in the wellbore are dispersive, meaning that long wave trains and associated relatively large amplitudes dominate the detected acoustic signals.

However, their frequency content of such acoustic waves is bounded at the lower end by a so-called cutoff frequency. Normal modes of acoustic energy propagation do not contain any energy below such frequency. The determining factor for the cutoff frequency is the characteristic length scale involved, namely, the wellbore diameter or radius. Generally, the higher the dominant frequency of the acoustic energy source, the lower the cutoff frequency, and the smaller the wellbore diameter, the higher the cutoff frequency.

It has been determined that an important consideration to be able to detect the direct wave is to eliminate or reduce the normal modes. Since it is not possible for purposes of controlling the measurement process to affect the wellbore diameter, it is useful to lower the dominant acoustic energy source frequency to cause the cutoff frequency of normal modes to be for frequencies near or beyond the upper end of the acoustic energy source spectrum. Having such low frequency acoustic energy source enable detecting "clean" acoustic signals where one can observe refracted P and S waves, direct waves, and even Stoneley waves.

If the foregoing conditions are met, namely, that the source frequency is selected such that the cutoff frequency for normal modes is above the source frequency spectrum limit, it is then only necessary to high-pass filter the detected acoustic signals in order to attenuate Stoneley waves therefrom. A standard semblance algorithm or similar velocity determination technique may then be used to estimate the acoustic velocity (or its inverse, "slowness") of the drilling mud. The slowness of the direct wave can then be picked by adjusting the picking parameters of the algorithm. See, for example, U.S. Pat. No. 5,654,938 issued to Tang.

Since the presence of gas in the drilling mud not only lowers its acoustic velocity but also can affect its resistivity and temperature, one could in principle detect it with a mud resistivity or temperature measurement. Field tests showed that mud resistivity gave results that agreed with the acoustic method described above. Temperature was not as sensitive and it is believed that larger volumes are needed to sufficiently affect the temperature in the borehole. One advantage of the acoustic method is its sensitivity to small amounts of gas. Another advantage is that is can be used with conventional acoustic well logging instruments.

The foregoing example explained with reference to FIG. 1 is a wireline conveyed well logging instrument. It is within the scope of this invention, however, to use acoustic well logging instruments that are conveyed by other means, including MWD instruments, which are typically conveyed by drill pipe. See, for example, U.S. Pat. No. 5,924,499 issued to Birchak et al. for an example of a suitable MWD instrument.

In one specific example, a difference between the mud velocity determined as explained above and the velocity of the mud when it is gas-free may be integrated with respect to depth (or axial distance along the wellbore). Such integral may provide an indication of the total expected gas flow into the wellbore from selected subsurface formations, e.g., formation 30 in FIG. 1.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying gas in a wellbore, comprising:
   imparting acoustic energy into the wellbore at a first selected position;
   detecting the acoustic energy at a second position in the wellbore spaced apart from the first position;
   determining an acoustic velocity of fluid in the wellbore from the detected acoustic energy;
   determining presence of gas in the fluid from the velocity;
   determining an integral with respect to distance along the wellbore of a difference between the determined acoustic velocity and a velocity of the fluid in the wellbore when it is devoid of gas to determine an expected gas flow into the wellbore; and
   displaying the expected gas flow into the wellbore.

2. The method of claim 1 further comprising selecting a maximum frequency content of the imparted acoustic energy to be lower than a normal mode cutoff frequency related to a diameter of the wellbore.

3. The method of claim 1 wherein presence of gas is determined when the fluid velocity drops below a velocity when the fluid is devoid of gas.

4. The method of claim 1 wherein the imparting and detecting are performed using a well logging instrument transducers configured for making measurements of acoustic velocity of subsurface formations adjacent to the wellbore.

5. The method of claim 1 wherein the determining acoustic velocity comprises detecting acoustic energy at a plurality of spaced apart positions and determining time correlated semblance between the acoustic energy.

* * * * *